United States Patent [19]

Harris et al.

[11] Patent Number: 5,466,030
[45] Date of Patent: Nov. 14, 1995

[54] SIDE LOADING VEHICLE: APPARATUS AND METHOD

[75] Inventors: Martin W. Harris; John J. Cambra, both of Manteca, Calif.

[73] Assignee: Tuff Boy Holding, Inc., Manteca, Calif.

[21] Appl. No.: 149,451

[22] Filed: Nov. 9, 1993

[51] Int. Cl.$^6$ ..................................................... B60P 7/04
[52] U.S. Cl. .......................... 296/98; 296/100; 296/181; 296/141; 160/243; 160/309
[58] Field of Search ............................ 296/98, 100, 181, 296/183, 141, 143; 160/242, 243, 309, 402

[56] References Cited

U.S. PATENT DOCUMENTS

| 473,292 | 4/1892 | Campbell | 296/100 |
|---|---|---|---|
| 1,318,820 | 10/1919 | Watkins | 296/98 |
| 1,820,869 | 8/1931 | Evers | 160/402 |
| 2,465,621 | 3/1949 | Wheeler | 296/100 X |
| 2,621,963 | 12/1952 | Harper | 296/143 |
| 2,967,734 | 1/1961 | Brown | 296/143 |
| 3,453,020 | 7/1969 | Santillo, Jr. | 296/100 |
| 3,709,552 | 1/1973 | Broadbent | 296/28 M |
| 4,037,870 | 7/1977 | O'Neal | 296/98 X |
| 4,523,784 | 6/1985 | Aspen | 296/100 |
| 4,623,189 | 11/1986 | Stead | 296/181 |
| 4,657,062 | 4/1987 | Tuerk | 296/98 X |
| 4,691,957 | 9/1987 | Ellingson | 296/98 |
| 4,700,985 | 10/1987 | Whitehead | 296/98 X |
| 4,943,110 | 7/1990 | Pastva | 296/181 |
| 4,987,942 | 1/1991 | Eriksson | 160/243 |
| 4,991,901 | 2/1991 | Meekhof, Sr. et al. | 296/98 |
| 5,002,328 | 3/1991 | Michel | 296/98 |
| 5,007,672 | 4/1991 | Kech | 296/10 |
| 5,186,231 | 2/1993 | Lewis | 296/98 X |
| 5,271,336 | 12/1993 | Willetts | 296/98 X |

FOREIGN PATENT DOCUMENTS

| 1122787 | 5/1982 | Canada | 296/100 |
|---|---|---|---|
| 2027827 | 4/1991 | Canada | 296/98 |
| 0018073 | 10/1980 | European Pat. Off. | 296/141 |
| 339850 | of 0000 | France | 160/309 |
| 2066746 | 7/1981 | United Kingdom | 296/100 |
| 2220621 | 1/1990 | United Kingdom | 296/181 |

OTHER PUBLICATIONS

Trailer/Body Builders, New Trucks, Trailers at UK Exhibit, Feb. 1993, pp. 49–55.
Allvan Tautliner, Your Blue Print to Value, entire article (3 pages).

*Primary Examiner*—Dennis H. Pedder
*Attorney, Agent, or Firm*—Bernhard Kreten

[57] ABSTRACT

A wheeled body (12) is provided having deck (14) with a framework (20) coupled thereto such that the volume outlined by the deck (14) and the framework (20) is unobstructed. The framework (20) consists of two framed ends vertically extending up from the deck (14) and a framed roof therebetween. The ends of the framework (20) can be enclosed by a variety of materials and are attached to recesses (16) in the four corners of the deck (14). The roof and longitudinal sides of the framework (20) are covered by an integrally formed shroud (90) that is secured to the roof of the framework (20). The sides are covered and uncovered by a scrolling mechanism (120) located at each end of the wheeled body (12). Each scrolling mechanism (120) is coupled through a 90° gear knuckle joint (200) to a scrolling rod (122) that is placed into and fastened to a loop (108) formed at the longitudinal edges (110) of the shroud (90). The scrolling mechanism (120) vertically scrolls one side of the one piece shroud (90). Openings (112) in the shroud loop (108) provide a space for the curved end of a "C" clip (248) to be detachably coupled to the scrolling rod (122) and the other end fastened to a strap (224). The strap (224) has been wound through and fastened to a pneumatic actuated strap tightener (220) that vertically tensions the shroud (90). The outsides of the four corners of the framework (20) each have a hinged clamp (60) used to clamp, seal, secure and horizontally tension the vertical edges (102) of the shroud (90).

33 Claims, 9 Drawing Sheets

SIDE LOADING VEHICLE: APPARATUS AND METHOD

FIELD OF THE INVENTION

This invention relates generally to side loading vehicles and in particular to flat bed trailers including framework supported on a bed of the trailer and having a one piece shroud that covers the top of the framework and having two longitudinal sides covered and uncovered by vertically scrolling corresponding sides of the one piece shroud.

BACKGROUND OF THE INVENTION

Conventional trucks with trailers having solid longitudinal sides provide limited access for the loading and unloading of the trailer by way of a narrow front or rear passageway. This requires considerable planning if stops at several locations are required for the loading or unloading of the trailer.

A number of innovations have arisen to provide access to the longitudinal sides of a trailer but problems still persist. For example, rigid, fan-folded panels that are used for the sides of the trailer may be susceptible to jamming and if damaged may not fold up at all. Another version includes "gull-wing" type panels where separate rigid panels when raised swing laterally outward. However, there may not always be lateral clearance to do so. Still another version uses flexible sides that scroll horizontally to one end of the trailer or the other. They still may provide an obstruction to the loading or unloading of cargo because it may be necessary to move the sides along the entire length of the trailer to provide access for the loading or unloading of cargo that is placed near one end of the trailer. This task is both laborious and time consuming. Another type is known which raises the top and side walls of the trailer. Such a system is effective except where there is no vertical clearance, such as in a garage.

The present invention overcomes jamming, lateral or vertical clearance and obstruction of the longitudinal sides of a trailer as well as further shortcomings inherent in accessing the bed of the trailer by way of its longitudinal sides. Jamming of the sides is avoided by providing side covers that are of a flexible construction. Lateral clearance is overcome by vertically scrolling the longitudinal sides of the shroud. Thus only the width of the vehicle itself is needed to access the longitudinal sides of the trailer. The one piece shroud with its scrolling longitudinal sides provide greater and quicker access to the bed of the trailer.

The following prior art reflects the state of the art of which applicant is aware and is included herewith to discharge applicants acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 3,453,020 | July 1, 1969 | Santillo, Jr. |
| 3,709,552 | January 9, 1973 | Broadbent |
| 4,943,110 | July 24, 1990 | Pastva |
| 5,007,672 | April 16, 1991 | koch |

OTHER PRIOR ART

Allvan Tautliner, Your Blue print to value, entire article (3 pages).

Trailer/Body Builders, New Trucks, Trailers at UK Exhibit, February 1993, pages 49–57.

U.S. Pat. No. 3,453,020 to Santillo, Jr. teaches the use of a side loading truck body having a permanent roof. The roof is center-supported and requires flexible tie members for selectively reinforcing the roof at spaced intervals. The tie members are shiftable so as not to interfere with the loading and unloading of the truck bed. The longitudinal sides of the truck bed consist of a plurality of sheet-like panels that open longitudinally by means of roller carriage assemblies sliding on a track assembly.

The present invention differs from the prior art in several ways. For example one difference is that the roof and sides are integrally formed into a one piece shroud. The shroud includes attachment ears that have been sewn to the interior of the shroud and fastened to both sides of a center most roof beam and to both sides of the cross limbs that comprise the roof. Another difference is that the sides of the shroud are vertically scrolled to reveal the upper surface of the wheeled body. Further, the framework is constructed in a fashion that alleviates the tie members that reinforce the roof thereby providing a volume for loading that is unobstructed.

U.S. Pat. No. 3,709,552 to Broadbent teaches the use of a van body with an open side closable by a longitudinally sliding curtain suspended from the roof of the body. One vertical edge of the curtain is detachably secured to an end of the open side and the other vertical curtain edge is connected with a rotary spool element at the opposite end of the open side onto which the curtain is wound for horizontal tensioning. Spool locking means is provided to prevent slackening of the tensioned curtain. The curtain is also tensioned vertically by straps by which the curtain is suspended and anchorages on the body.

The present invention differs in a variety of ways. The roof and sides are integrally formed into a one piece shroud. The shroud includes attachment ears that have been sewn to the interior of the shroud and fastened to both sides of a center most roof beam and to both sides of the cross limbs that comprise the roof. The sides of the shroud are vertically scrolled to reveal the upper surface of the wheeled body and do not slide horizontally. Hinged clamps are used to seal the vertical edges of the longitudinal sides of the shroud. A scrolling rod is placed into a loop formed by the shroud. The scrolling rod and the loop both run the length of the longitudinal edges of the shroud. Horizontally spaced openings in the longitudinal edge loops of the shroud provides the means for the curved ends of "C" clips to be detachably coupled to the scrolling rod and other ends to be fastened to straps. The straps are individually wound through and fastened to an air actuated strap tightener which provides the hold down means for the shroud.

U.S. Pat. No. 4,943,110 to Pastva teaches the use of a curtainside truck trailer access system and lock assembly. The system for accessing interior portions of a curtainside truck trailer includes a flexible curtain, upper and lower roller assemblies secured to the curtain for engagement with upper and lower rails that are mounted on the truck trailer for supporting the curtain during the expanding and contracting movement of the curtain along the rails. A support panel is mounted between upper and lower longitudinal edge portions of the truck trailer, and a latching mechanism is connected to the support panel which includes a shaft engagement with a keeper attached to the curtain. An operating member is attached to the shaft for rotating the shaft about its longitudinal axis and engaging the latch and keeper. A latch guide is captively engaged by the latch and attached to the support panel for guiding movement of the latch into engagement with the keeper. A spring biased locking mechanism is used for locking the latching mechanism and securing the curtain in the closed position.

The present invention differs in that the flexible shroud is scrolled vertically for accessing the interior portions of a wheeled body thereby eliminating the need for the above mentioned roller assemblies and rails which are used for expanding or contracting the curtain. Another difference is in the way the shroud is secured. For securing the shroud in the closed position the present invention uses vertically hinged clamps and horizontally spaced "C" clips with straps that are tensioned by air pot means instead of the latching mechanism described in the above paragraph.

U.S. Pat. No. 5,007,672 to Koch teaches the use of a tarpaulin side kit for use with a separate top cover in covering a load on a vehicle having a flat bed and a plurality of post brackets mounted at spaced apart locations along the periphery of the flat bed. The side kit includes a plurality of longitudinally arranged inverted U-shaped bows, a plurality of side posts, and a plurality of side cover sections formed of a flexible, sheet-like tarp material. The side cover sections each have a plurality of pockets sized to receive the side posts and support the side cover sections from slipping down on the posts. A weather flap extends along the length of each of the side cover sections and overlies the flat bed to protect the load from weather. The top cover is formed of a flexible, sheet like tarpaulin material supported by the plurality of U-shaped bows and sized to extend over the top of a load carried on the flat bed of the vehicle.

The present invention differs from the prior art in several ways. For example one difference is that the roof and sides are integrally formed into a one piece shroud. The shroud includes attachment ears that are sewn into the shroud and fastened to a center most longitudinal roof beam and to cross limbs that form the roof. Another difference is that the sides of the shroud are vertically scrolled to reveal the base of the wheeled body. The invention also allows clear access to the longitudinal sides of a wheeled vehicle for the loading and unloading of cargo. Furthermore, the present invention provides a less time consuming and laborious manner in which the cargo can be covered or uncovered.

Under the above heading, Other Prior Art, two articles are listed. The first article is entitled "Your Blue Print to Value" by the company Allvan Tautliner. This article is an advertisement that consists of the patented material found in U.S. Pat. No. 3,709,552 that has been previously discussed.

The second article is entitled "New Trucks, Trailers at UK Exhibit". This article shows and briefly describes different variations of new trucks and trailers displayed at the 1992 exhibition in Telford, England. The variations of the new trailers displayed at the exhibition are as follows: (1) A trailer having pneumatically locked sliding side doors; (2) A trailer that contains a plurality of rigid side doors that are opened by a counterbalancing mechanism which raises the door above the horizontal plane of the roof of the trailer; (3) A trailer that has quick-release curtains on all three sides and are tensioned by a foot lever, but raised manually with a vertical roller including a mechanism at the rear of the trailer that releases curtain tension and all the buckles so that they do not have to be unbuckled individually; (4) A trailer that has a sophisticated garage door type mechanism for the sides and rear openings of a trailer; (5) A trailer that contains vertically rising side curtains that form pleats or accordion folds as it rises; (6) A trailer with an aluminum flap-side body having full-opening flap doors where a top-hinged upper flap opens automatically when the bottom-hinged lower flap is pulled open via a chain mechanism.

A trailer displayed at the exhibition revealed individual quick-release curtains on all three sides that are tensioned by a foot lever, but raised manually with a vertical roller that is located and operated on the longitudinal sides of the trailer. Further, the trailer includes a mechanism at the rear of the trailer that releases curtain tension and all the buckles so that they do not have to be unbuckled individually.

Inter alia, the present invention differs in that is uses a one piece shroud that is draped over the roof and the longitudinal sides of the trailer. The shroud includes attachment ears that are sewn on the interior of the shroud and fastened to members of the roof. The longitudinal sides of the trailer are scrolled by a scrolling mechanism located and operated at the rear or forward end of the trailer. This provides a safety feature in that if the loading or unloading of the cargo is started while the shroud is still being scrolled the operator is not endangered by being along the longitudinal sides of the trailer. More importantly, if the load shifts during transit the operator is clear from the sides where the cargo is likely to spill out.

Another trailer at the exhibit showed vertically rising side curtains that formed pleats or accordion folds as it was raised. This trailer does not use any buckles or straps for fastening the curtains. The vertically raised curtains that form a pleat or accordion style folds do not provide clear access along the upper portion of the longitudinal sides of the trailer; consequently, an extension of the roof itself was incorporated into a trailer.

The present invention differs in several ways. For example it uses a one piece shroud that is draped over the roof and the longitudinal sides of the trailer. The shroud includes attachment ears that are sewn on the interior of the shroud and fastened to members of the roof. The longitudinal sides of the trailer are scrolled by a scrolling mechanism and are not vertically raised in a manner which forms pleats or accordion style folds.

SUMMARY OF THE INVENTION

The present invention provides a new and improved side loading vehicle. The side loading vehicle is characterized by a wheeled flat bed type body and a flamework superstructure supported on the bed consisting of framed ends, which are attached to and extend vertically upward from ends of the wheeled body bed, and framing roof members extend therebetween. A one piece shroud covers the roof and both longitudinal sides of the wheeled vehicle.

Attachment ears are sewn to the interior of the shroud. The shroud is secured to the roof members by sandwiching the attachment ears between a bolted flat bar and the roof members. On an outside of the roof, leading and trailing edges of the shroud are sealed and secured to each framed end by bolting a flat bar over the shroud and onto a header of the framed ends.

With the shroud securely fastened to the roof, the sides can be raised vertically by scrolling the shroud over a scrolling rod. The scrolling rod runs the length of the shroud and is carried in a loop in a lower edge of the shroud. A scrolling mechanism for the scrolling rod may be configured as an offset crank with a fixed shaft or a fixed gear box with an "extendible" drive arm. Both configurations use a 90° gear knuckle joint to couple the scrolling mechanism to the scrolling rod.

A hinged clamp secures the leading and trailing vertical edges of the shroud to the four corners of the trailer. A rope is sewn into the vertical edges of the shroud so that they may be securely held by the clamping action of the hinged clamp. The shroud is reinforced at clamp wear points and a flat rubber strip is placed on the inside vertical edge of each hinged clamp to provide a seal that is impervious to the elements such as wind and rain. The locking action of each hinged clamp is accomplished by a pawl arrangement attached to the bottom end of the clamp.

Lower edges of the longitudinal sides of the shroud are secured at a number of points on each side of the trailer. This is accomplished by placing "C" clips over the scrolling rods and tensioning them by using individually driven air pots. The air pots are actuated by a single valve from a pneumatic source and are coupled to the "C" clips by way of straps.

The invention provides a wheeled body framed to support a flexible superstructure designed to prevent cracking at stress areas and to provide clear access for the loading and unloading of the vehicle by the way of its longitudinal sides. Furthermore, the flexible superstructure is made from a low maintenance, durable, light weight and relatively inexpensive material.

OBJECTS OF THE INVENTION

A primary object of this invention is to provide a new and novel side loading vehicle.

A further object is to provide a device as characterized above which includes a shroud which is of a one piece construction that covers the roof and both longitudinal sides of a wheeled vehicle.

Another further object is to provide a light weight shroud formed of inexpensive material (PVC Coated Nylon Fabric).

Another further object is to provide a framework which supports the shroud and provides clear access for the loading and unloading of the wheeled vehicle by the way of its longitudinal sides.

Another further object is to provide a low maintenance encapsulating means for the wheeled vehicle.

Another further object is to provide a flexible superstructure that prevents cracking at stress areas.

Another further object is to provide a means to vertically scroll the longitudinal sides of the integrally formed shroud.

Another further object is to provide a pneumatically actuated strap tightener to vertically tighten the shroud.

Another further object is to provide vertically extending clamps that vertically lock and seal the shroud so that it is impervious to the elements such as rain and wind.

Viewed from a first vantage point it is an object of the present invention to provide a side loading vehicle, comprising a wheeled body having an upper surface upon which cargo is to be placed, a framework extending up from the upper surface, a shroud draped on the framework and scrolling means coupled to the shroud for raising and lowering the shroud to provide or occlude access to the upper surface of the wheeled body.

Viewed from a second vantage point it is an object of the present invention to provide a side loading vehicle, comprising a wheeled body having an upper surface upon which cargo is to be placed, a framework extending up from the upper body, a flexible shroud including a top wall configured as a roof and a pair of side walls defining curtains integrally formed therewith, with an area of transition between the top wall and the side walls imperforate and substantially impervious to the elements such as wind and rain.

Viewed from a third vantage point it is an object of the present invention to provide a method for enclosing a volume above a vehicle having a flat bed to protect the thusly enclosed volume from the elements; the steps including: constructing a framework on the bed defining an outline of the enclosed volume, draping a flexible shroud over the framework to enclose the volume and fastening the shroud to the framework and bed.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to a side loading vehicle according to the present invention.

Figures 1, 1A:
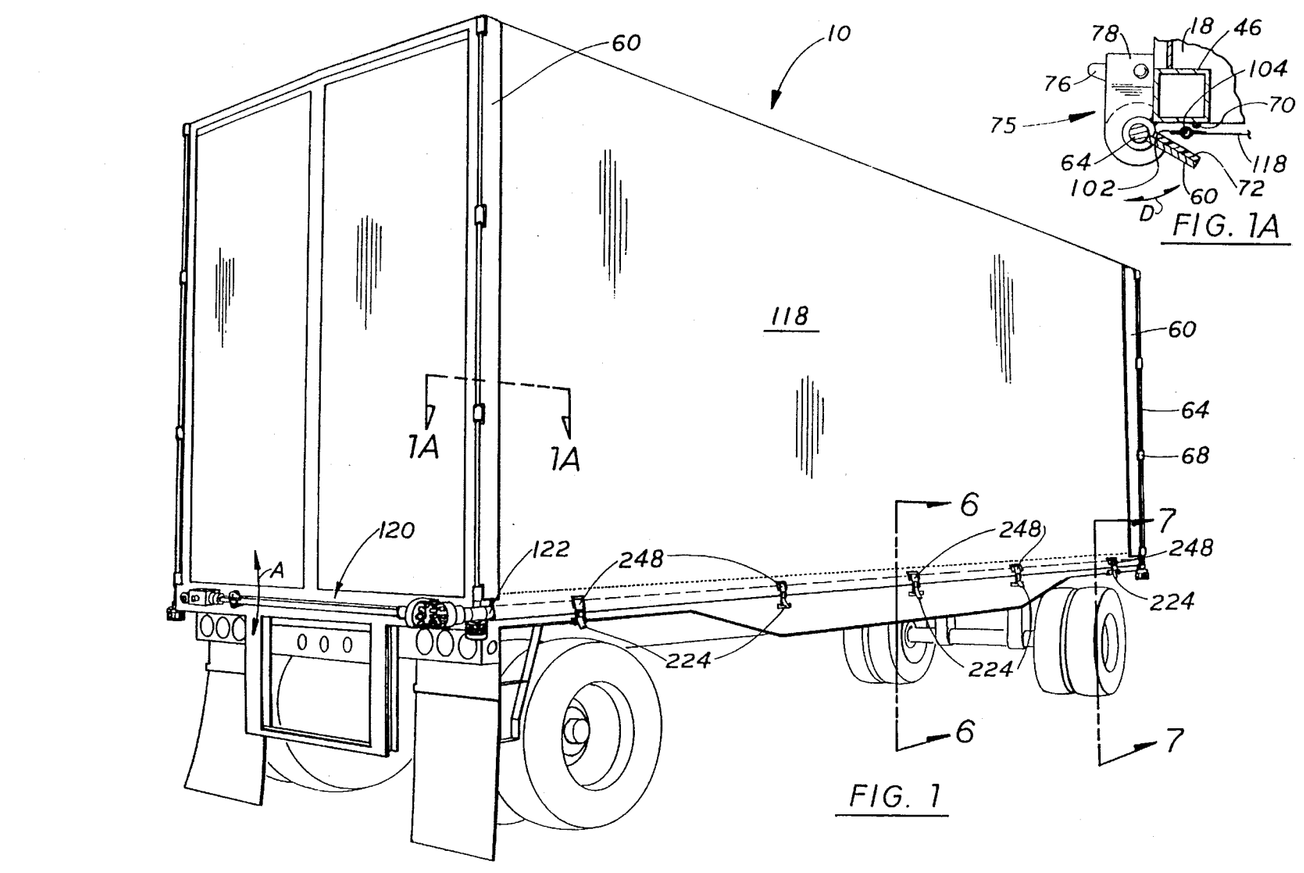
FIG. 1 is a perspective view from a side and rear of the wheeled body with the side portion of the shroud in a closed position.
FIG. 1A is sectional view taken along the line 1A—1A of FIG. 1.
Figures 2, 2A:
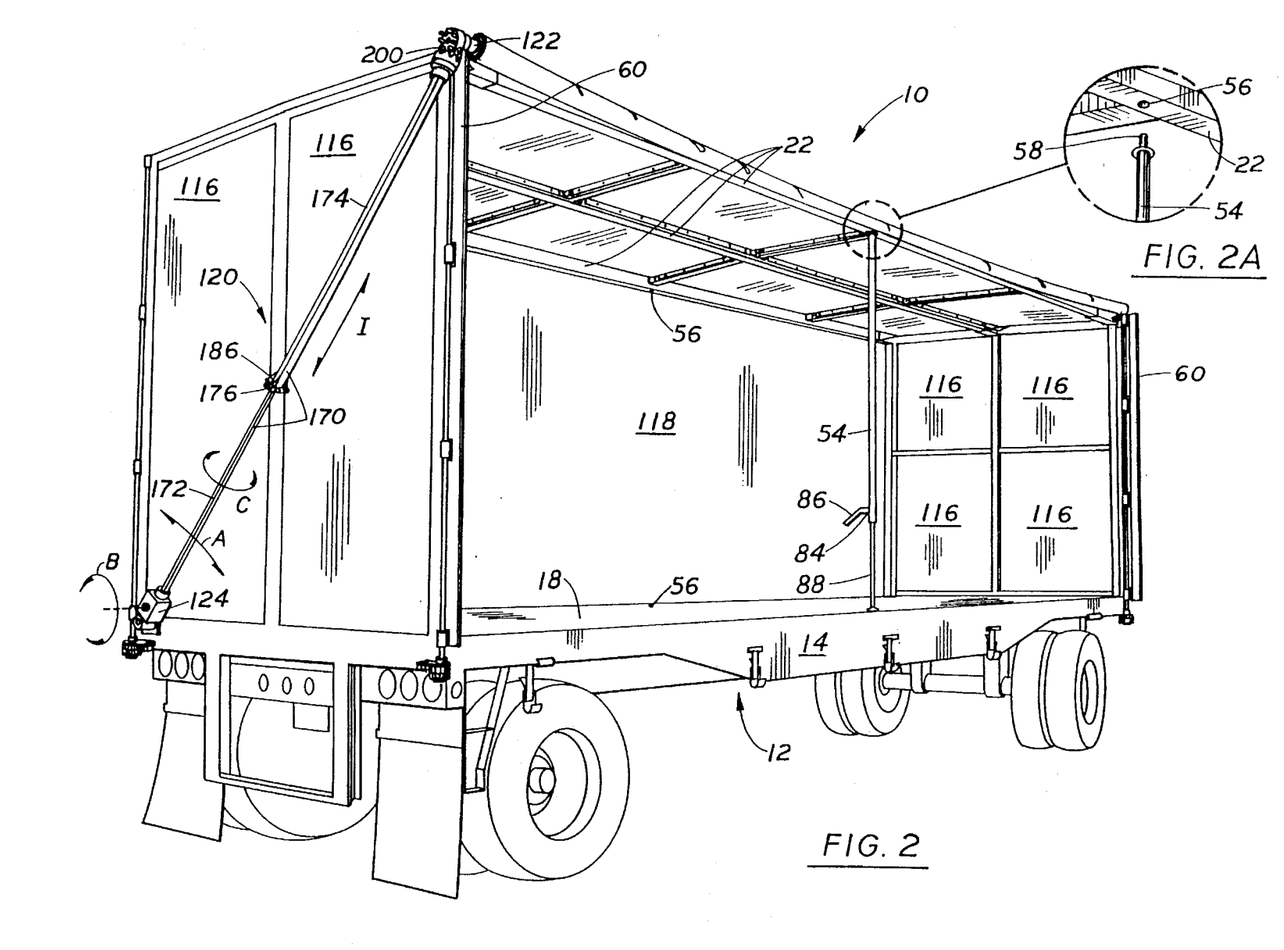
FIG. 2 is a perspective view similar to FIG. 1 of the wheeled body with the side portion of the shroud in an opened position.
FIG. 2A is a perspective detail of FIG. 2.

In essence, and referring to FIG. 2, the side loading vehicle 10 includes a wheeled body 12 having a deck 14 with an upper surface 18 upon which cargo is to be placed. A framework 20 (FIG. 3) extending up from the deck 14 is attached thereto. A one piece flexible shroud 90 (FIG. 3A) defining an enclosure includes a roof top wall 100 and a pair of side walls 118 defining curtains integrally formed therewith draped on the framework 20. An area of transition between the roof top wall 100 and the side walls 118 are imperforate and therefore substantially impervious to the elements such as wind and rain. The shroud 90 is securely fastened to the framework 20. A scrolling mechanism 120 is coupled to the shroud 90 for raising and lowering the side walls 118 of the shroud 90 to provide or occlude access to the upper surface 18 of the deck 14 of the wheeled body 12. A hinged clamp 60 secures the leading and trailing vertical edges 102 of the shroud 90 to four outside corners of the framework 20. Bottom edges 110 of the longitudinal side walls 118 of the shroud 90 are secured by a plurality of straps 224 (see FIG. 1) that are attached to "C" clips 248 which are in turn detachably coupled to scrolling rods 122. The straps 224 are secured to and tensioned by pneumatically actuated airpots 222 (see FIG. 6).

Figure 3:
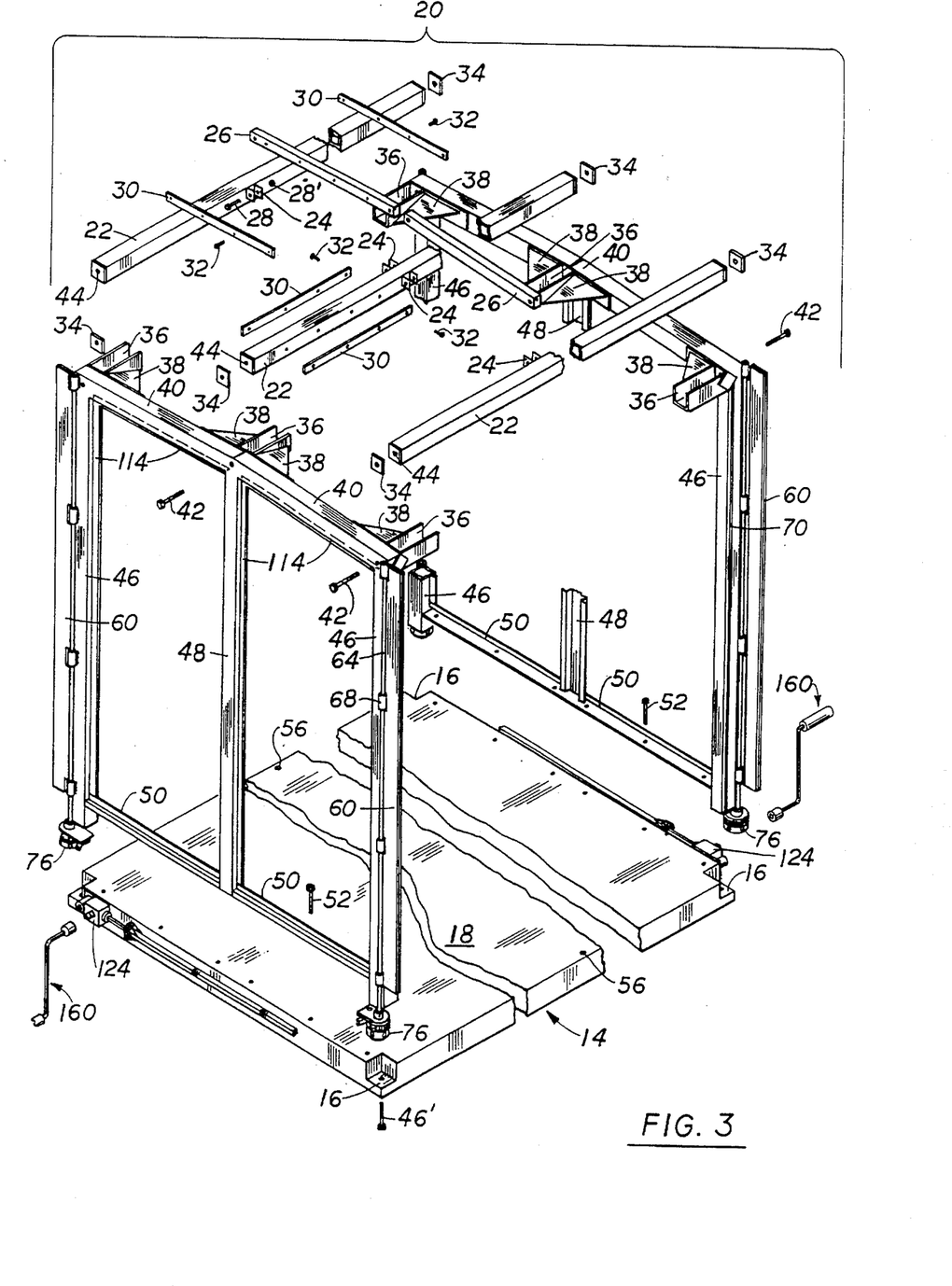
FIG. 3 is a compressed exploded parts view of the framework.

FIG. 3 shows the deck 14, of the wheeled body 12, and the framework 20 defining an outline of a volume to be enclosed. The framework 20 consists of two welded framed ends that extend vertically up from the deck 14. Framed roof members 22 extend therebetween. Each framed end is similar in construction and consists of two corner posts 46, a middle end upright strut 48, two spreaders 50 located at lower ends of corner posts 46 and a header 40 at an upper end. The corner posts 46 are preferably formed from square stock and are placed into and bolted, by bolts 46', to square recesses 16 in the four corners of the deck 14. The spreaders 50 are bolted, by bolts 52, to the upper surface 18 of deck 14 between the corner posts 46. The middle upright struts 48 are interposed between two spreaders 50 at each end. Each header 40 is attached to both the top ends of the corner posts 46 and to the top of the middle upright strut 48 thereby completing the composition of the two framed ends.

The framework 20 has upwardly open U-channels 36 welded orthogonally to the headers 40 at ends of the headers 40 adjacent the four corner posts 46 and also at a middle portion adjacent the middle upright struts 48. Gussets 38 are welded proximate to the top of the four corner posts 46 along adjacent sides of the interior angles formed by the U-channels 36 and the headers 40. Gussets 38 are also welded on both sides of the interior U-channels 36 and to the header 40 in which the interior U-channels 36 are attached. The U-channels 36 extend horizontally away from the adjacent header 40 and toward the opposite end of the framework 20 a short distance.

Roof beams 22 run longitudinally between the rear and forward framed ends of the framework 20. Ends of the roof beams 22 lie in the U-channels 36. Rubber spacers 34 are placed in U-channels 36 between the ends of the roof beams 22 and the headers 40 to dampen axial and torsional flexing motions. At least one bolt 42 (and a nut 44 welded at the ends of the roof beams 22), are used to attach the ends of the roof beams 22 to the headers 40. Metal tabs 24 are welded to the roof beams 22 to allow cross limbs 26 to be secured between two adjacent roof beams 22. Fasteners such as nuts 28 and bolts 28 are used for the attachment of the cross limbs 26 to the roof beams 22. Preferably three roof beams 22 and six cross limbs 26 are provided. The longitudinal sides of the framework 20 remain unframed to provide unobstructed access to the upper surface 18 of the deck 14.

To provide the roof of the framework 20 with greater stability, a removable center support prop 54 (FIG. 2) is placed between the deck 14 and the roof beam 22. FIG. 2A shows an upper end of the prop 54 in detail. The center support prop 54 is raised and lowered by a ratchet type mechanism 84 which is analogous to a standard bumper style car jack. The ratchet type mechanism 84 includes a lever arm 86 which raises or lowers the prop 54 relative to a lower prop foot 88 which telescopes within the prop 54. Holes 56 are provided in the middle of the outer most roof beams 22 and the longitudinal edges of the deck 14 for the insertion of pinned ends 58 of the center support prop 54.

Channels 114 (see FIG. 3) circumscribe an inner periphery of the framed ends to support end panels such as the panels 116 shown in FIG. 2. The channels 114 may cooperate with swing out doors, vinyl shrouds, reinforced fiberglass panels, high density overlay plywood panels or other similar sheet-like materials.

Figure 3A:
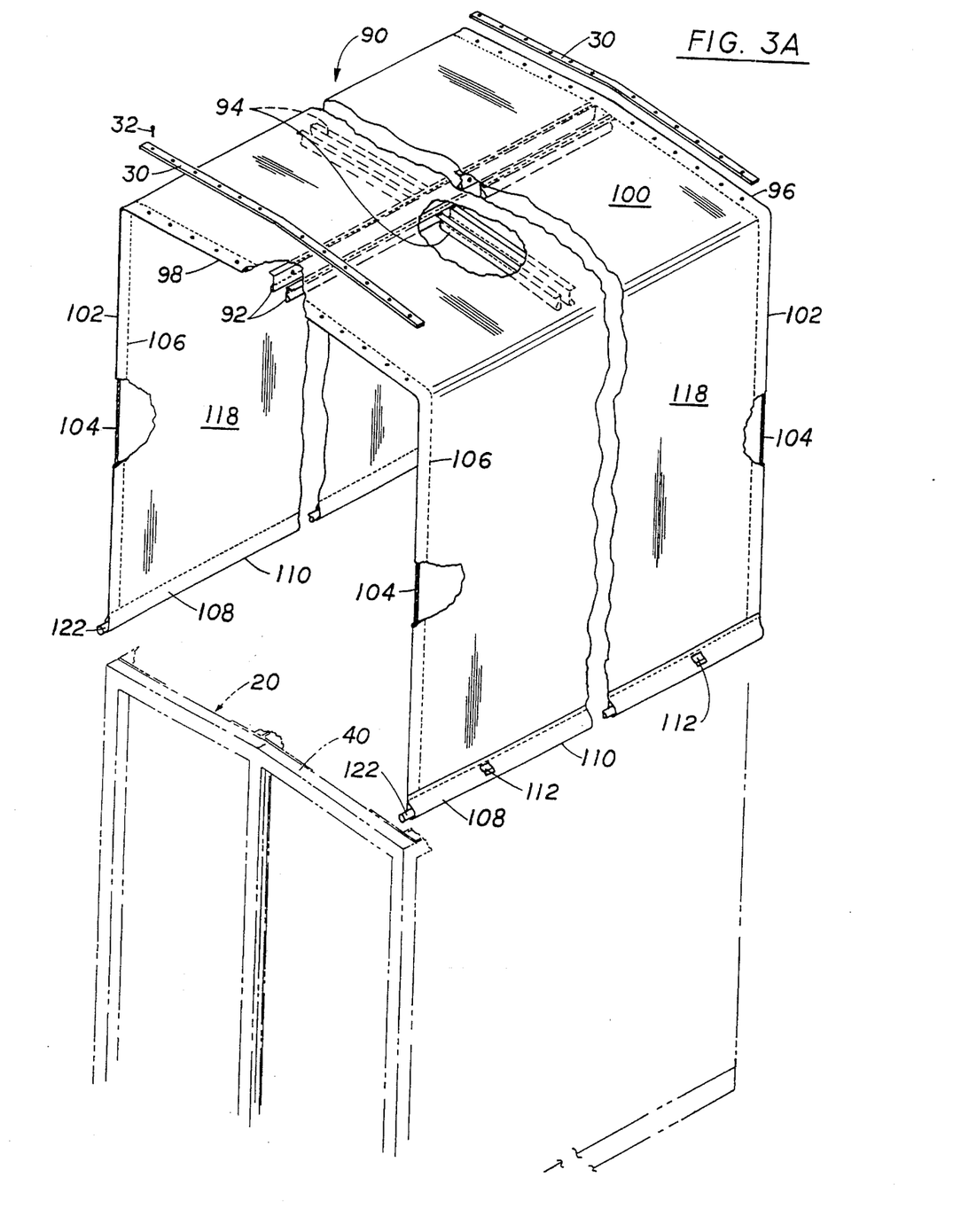
FIG. 3A is a compressed perspective view of the one piece shroud and a portion of the framework shown in FIG. 3.

FIG. 3A reveals a one piece flexible shroud 90 which is draped over the top and both longitudinal sides of the framework 20. The shroud includes attachment ears 92 and 94 which have been attached to an interior of the shroud 90. Ears 92 run parallel to the longitudinal axis of the vehicle while ears 94 run perpendicular. The shroud 90 is secured to the top of the framework 20 by first sandwiching an attachment ear 92 between a flat bar 30 (FIG. 3) and each side of the inner most roof beam 22 (FIG. 3) and then using bolts 32 to secure the flat bar 30 to the roof beam 22. Flat bars 30 are also used for securing ears 94 of the shroud 90 to each side of the cross limbs 26 (FIG. 3). The shroud 90 includes a leading roof edge 96 and a trailing roof edge 98. The leading and trailing roof edges of the outside of the shroud, 96 and 98 respectively, are sealed and,secured by placing a flat bar 30 over the edges 96, 98 of the shroud 90 and bolting it onto the header 40 with bolts 32. Thus, the roof portion 100 of the shroud 90 is fixed to the framework 20.

FIG. 1 of the drawing figures shows an embodiment of the scrolling mechanism 120 that is provided at each of the exterior ends of the framework 20 (FIG. 3). The scrolling mechanism 120 is shown in its closed position in FIG. 1 and in its open position in FIG. 2. Referring to FIG. 2, the scrolling mechanism 120 consists of a pivotable gear box 124 coupled to an extendible drive arm 170. The extendible drive arm 170 includes a first drive arm 172 which telescopes along arrow I within a second drive arm 174. Both can be square in cross-section. A 90° gear knuckle joint 200 couples the extendible drive arm 170 to a scrolling rod 122, transferring rotation from the gear box 124 to the scrolling rod 122.

Figure 10:
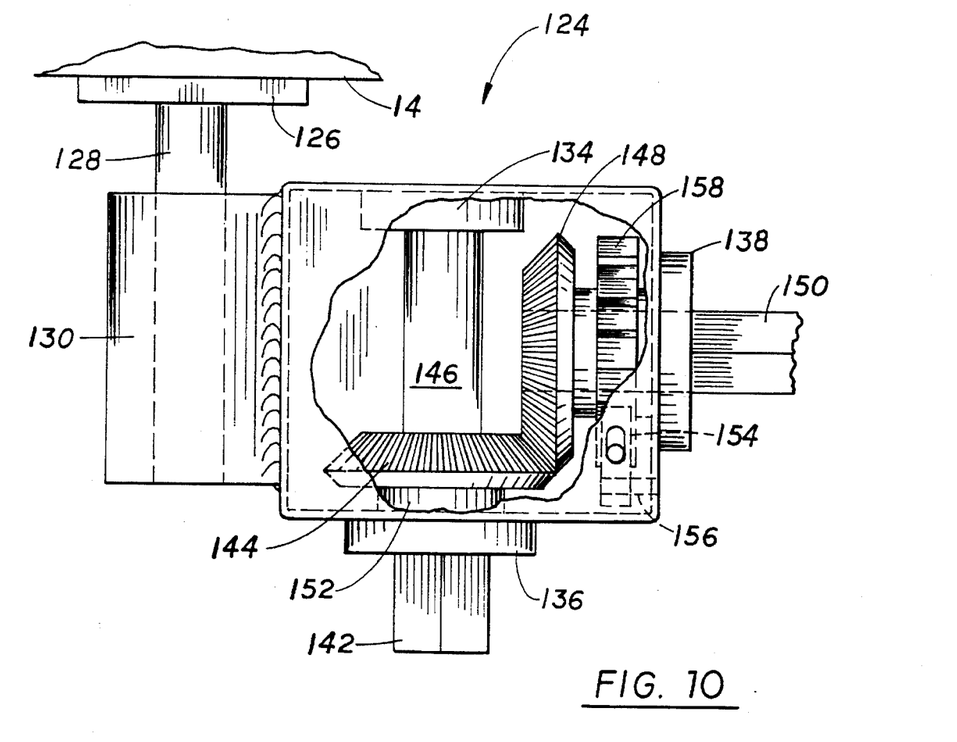
FIG. 10 is a top plan view of the gear box with the top removed.
Figure 11:
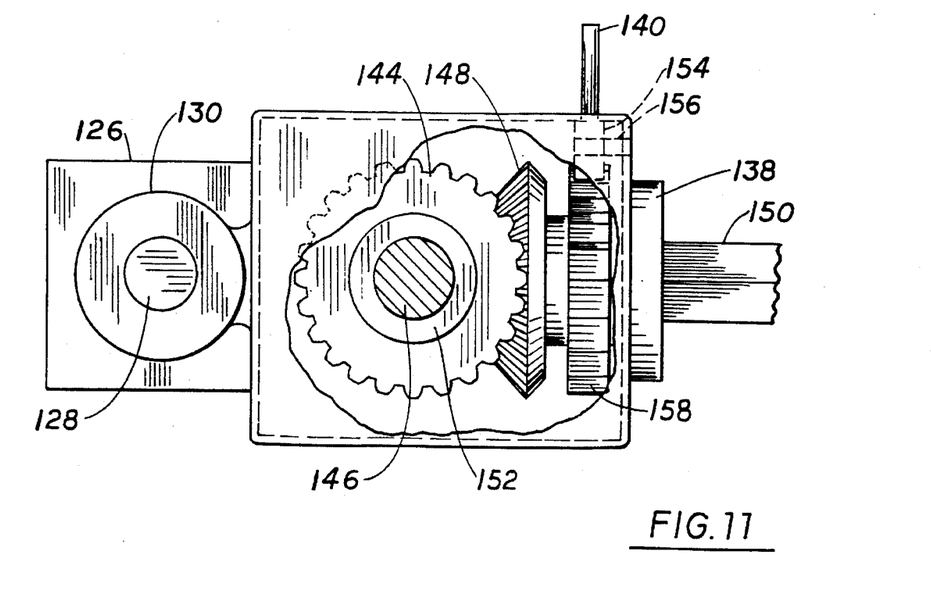
FIG. 11 is a front side elevational view of the gear box with the front side removed.

Referring to FIGS. 10 and 11, a mounting plate 126 is shown which comprises a shaft 128 pivotably coupled to a gear box 124 by way of collar 130. The mounting plate 126 in turn is secured to the exterior ends of the deck 14 of the wheeled body 12 providing the rotation about arrow A of FIGS. 1 and 2.

The pivotable gear box 124 can be seen in detail in FIGS. 10 and 11. The gear box 124 uses bevel gearing, pinion 144 and gear 148, to transmit motion between shafts whose axes intersect or are at a 90° angle. A pinion shaft 146 is supported by and rotates within two steel collars 134, 136. The first steel collar 134 is rigidly secured within and at the back of the gear box 124. The second steel collar 136 is coaxially aligned with the first steel collar 134 and rigidly secured on the outside front of the gear box 124. The input shaft or pinion shaft 146 is substantially cylindrical in shape between and within the two steel collars 134, 136. The end 142 of the pinion shaft 146 is squared off so that the socket end 164 of crank arm 160 can operatively be coupled thereto (see FIG. 4). The pinion shaft 146 has pinion 144 mounted on it which drives gear 148. A spacer 152 is interposed between the inside front of the gear box and the back of pinion 144 to provide the correct amount of meshing of pinion 144 with gear 148. Gear 148 is mounted on a substantially cylindrical output shaft 150 which carries winch gear 158 fixed thereto. Shaft 150 in turn is supported by and rotates within the steel collar 138 located on the outside of gear box 124. The shaft 150 is connected to first drive arm 172. A thumb lever 140 operates pawl 154 that has been movably secured to the gear box 124 by way of pin 156. By operating the thumb lever the pawl 154 engages the winch gear 158 thereby providing a locking and unlocking means for the operation of gear box 124.

Figure 4:
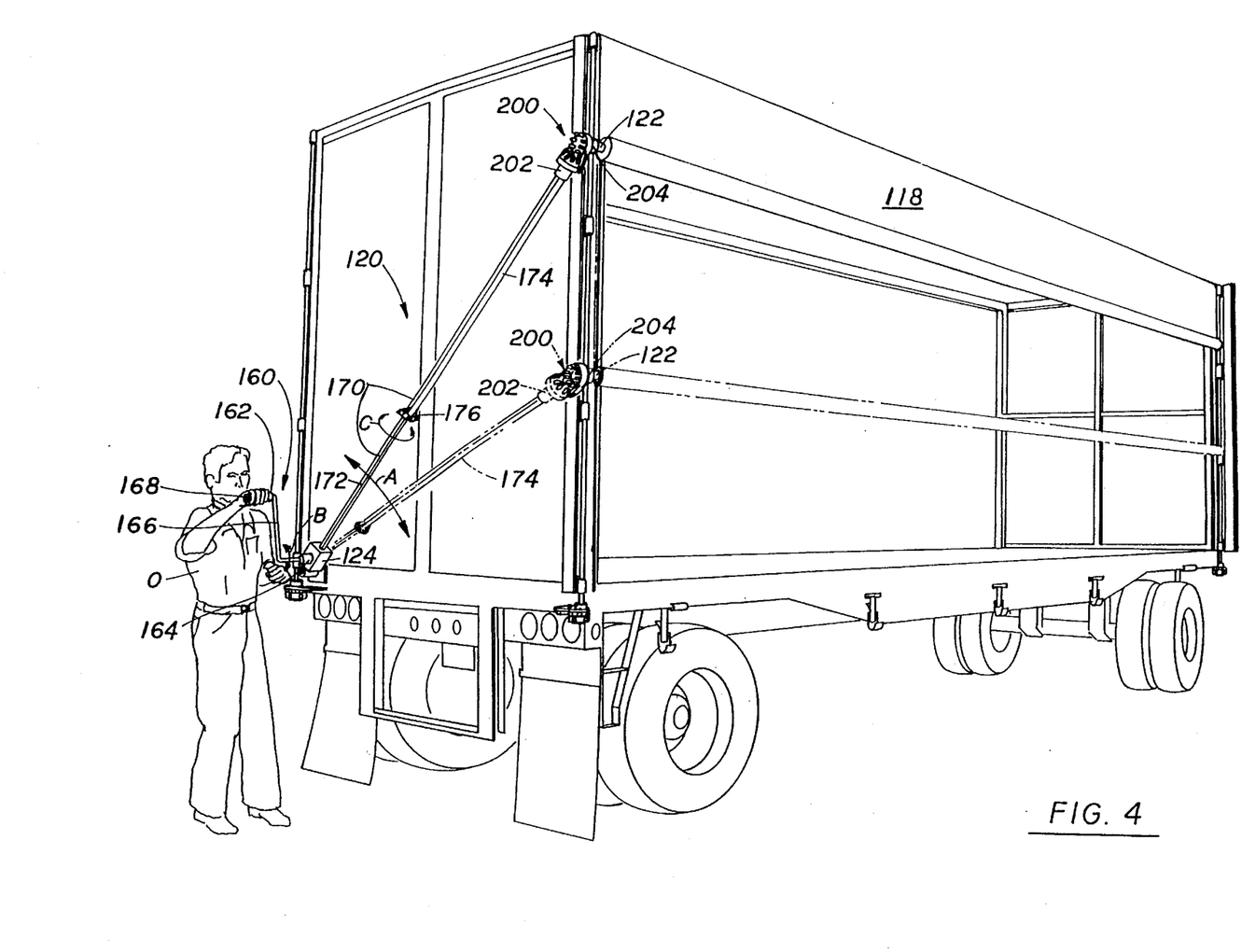
FIG. 4 is a perspective view of the wheeled body showing one embodiment for raising and lowering a side of the integrally formed shroud.

As shown in FIG. 4, an operator O uses a crank arm 160 to raise and lower the sides 118. The crank arm has a handle end 162 and a socket end 164 which are parallel to each other but offset by crank lever 166. The handle 162 rolls over a core 168 so that rotation about arrow "B" rotates the pinion 144 and gear 148 in the gear box 124. The gear box 124 transmits the rotation of crank 160 to first drive arm 172 about arrow "C" and therefor to second hollow drive arm 174. This rotation is transferred to the scrolling rod 122 through the knuckle joint 200.

Figure 12:
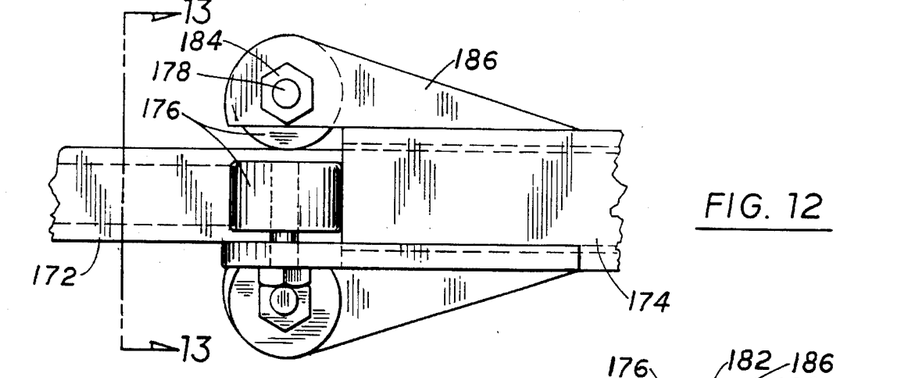
FIG. 12 is a side elevational view of the radial bearings mounted on a drive arm.
Figures 13, 14:
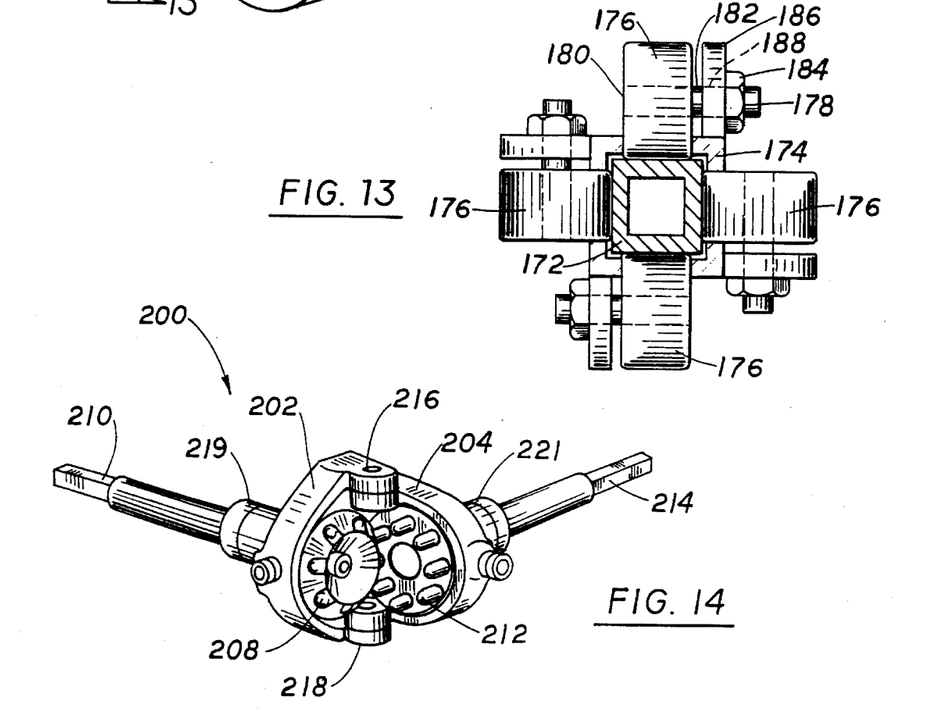
FIG. 13 is sectional view taken along the line 13—13 of FIG. 12.
FIG. 14 is a perspective view of the 90° gear knuckle joint in the open position.

Proximate to the telescopic interconnection of the first and second drive arms 172, 174 are four radial bearings 176. Three of the bearings 176 are shown in FIG. 12 and all four are shown in FIG. 13. Each of the four bearings 176 are rotatably secured on an axle 178 and coupled by way of plates 186 to the four sides of the second drive arm 174. Each axle 178 is flush with the bearing 176 at one end 180 and projects from a second end 182. The projecting end of each axle 178 is adequate in length to pass through a passage 188 in plate 186 and contains a threaded end in which a nut 184 secures the axle 178 to the plate 186. Each of the four plates 186 are welded to the second drive arm 174 and provide the means, as described above, to secure the bearings such that their faces ride on top of the first drive arm 172. This provides smooth operation of the extendible drive arm 170 as the first drive arm 172 extends and contracts within the second drive arm 174.

Figure 15:
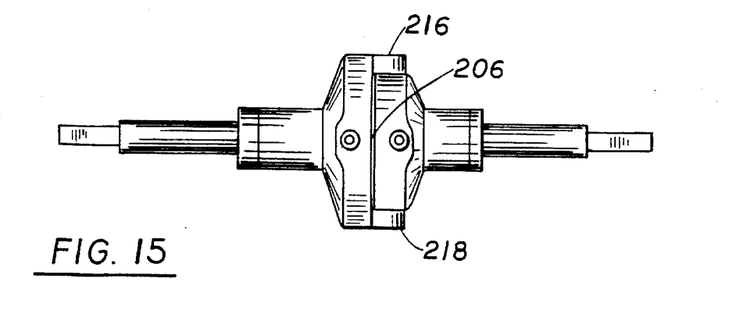
FIG. 15 is perspective view of the 90° gear knuckle joint in the closed position.

Referring to FIGS. 14 and 15, the 90° gear knuckle 200 is composed of forked coupling halves 202 and 204 with a central portion 206 interleaved therebetween. The central portion 206 consists of a driving socket gear 208 and a driven ball gear 212 rigidly mounted on second drive arm 174 and scrolling rod 122, respectively. Second drive arm 174 is connected to axle 210. Scroll rod 122 is connected to axle 214. Axles 210 and 214 are free to rotate in sleeved ends 219 and 221 of the coupling halves 202 and 204 but drive socket gear 208 and ball gear 212, respectively. The forked coupling halves 202 and 204 are pivotably hinged at ends 216 and 218. This allows the ball and socket gears 212, 208 to remain in contact for efficient operation at angles from 0° to 92°, with virtually no loss of turning power. The pivotably hinged ends 216, 218 automatically align the gear knuckle 200 to the proper position, eliminating the possibility of binding when in use and operation.

The scrolling rod 122 (see FIG. 4) is inserted into and runs the length of a loop 108 formed by a lower longitudinal edge 110 (FIG. 3A) of the shroud 90. The scrolling rod 122 is fastened to the loop 108 of the shroud 90. Both longitudinal sides 118 of the shroud 90 are raised vertically by scrolling the shroud 90 over the scrolling rod 122. As can be seen by comparison of FIGS. 1 and 2, the pivotable gear box 124 rotates about arrow A as the extendible drive arm 170 sweeps an arc while the sides 118 are scrolled or unscrolled.

Figure 5:
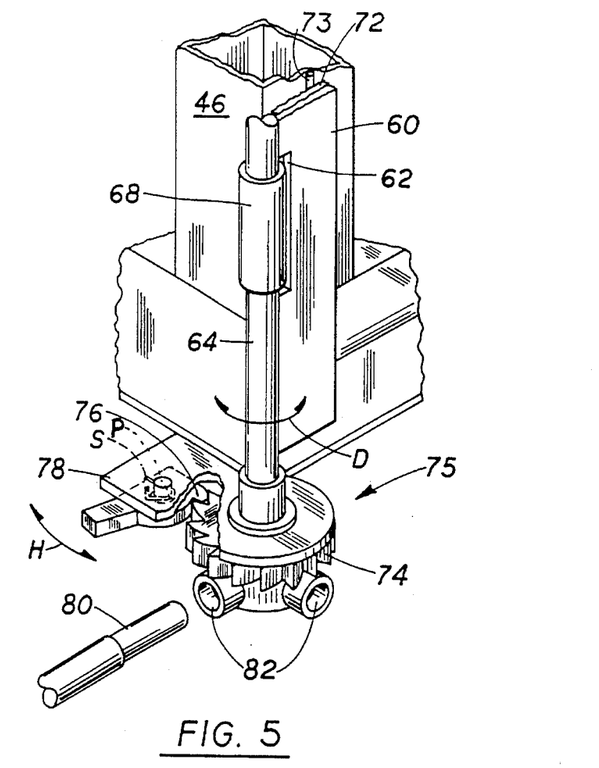
FIG. 5 is a perspective view of the pawl mechanism which tensions and locks the vertically hinged clamp that is attached at each of the corner posts.

Vertical hinged clamps 60 are shown in the closed position in FIGS. 1 and in an open position in FIGS. 2 and 3. The clamps 60 shown provide one version of a securing means which secures vertical edges 102 of the shroud 90 (FIG. 3A) to the four corner posts 46 of the framework 20 (FIG. 3). FIG. 3A shows a partial cutaway view of the shroud 90 revealing a rope 104 that is sewn into the vertical edges 102 of the shroud 90 so that the vertical edges 102 may be securely held by the clamping action of the hinged clamp 60. The shroud 90 has also been reinforced at clamp wear points 106 by a seam which captures rope 104. A bonded flat rubber strip 72 (FIG. 1A) is provided on the locking side or compression side of the hinged clamp 60 to provide a seal that is impervious to the elements such as wind and rain. Beads 70 welded to all four corner posts 46 trap and hold the edges 102 of the shroud 90. Locking action of each hinged clamp 60 is accomplished by a pawl 76 (FIG. 5) attached to the bottom end of a clamp activating mechanism. The pawl 76 is pivoted to pawl plate 78 via pivot P. The pawl 76 can be hand operated to press into and hold the position of a ratchet wheel 74 which connects clamp 60 to a clamp shaft 64. The clamp 60 includes clearance cutout 62 to allow the clamp shaft 64 to be supported by corner post 46 via clamp sleeve 68 which is welded to post 46. A drive bar 80 couples to wheel 74 by socket 82 formed below wheel 74 to rotate clamp shaft 64 about arrow D.

Figure 6:
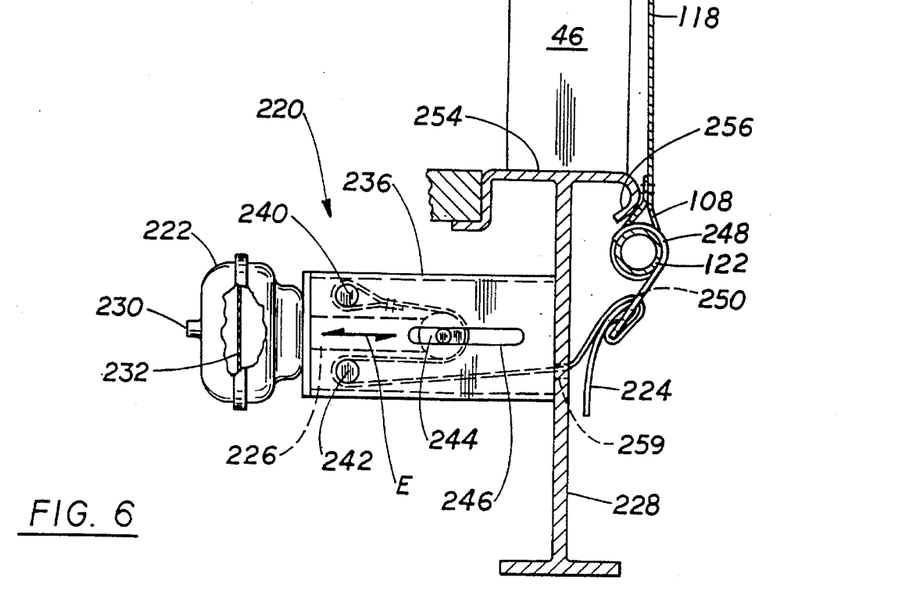
FIG. 6 is a side view taken along line 6—6 of FIG. 1 of a strap tightening means to retain the side portion of the shroud.

FIG. 6 shows one version of a air pot tensioning means 220 to secure the longitudinal bottom edges 110 of the shroud sides 118. Air pots 222 couple to straps 224 which are tensioned by rods 226 coupled to the air pots 222. The air pots 222 are fixedly attached to an I-beam 228 forming a portion of the deck 14. In essence, the airpot 222 has a pneumatic input 230 for allowing air to enter into the pot 222 and push a diaphragm 232 between a first and second position. The diaphragm 232 is operatively coupled to a push rod 226 which moves in accordance with the direction of the double ended arrows E. The rod 226 is contained within a shaft housing 236 which is substantially rectangular in shape and welded to a face of the I-beam 228 remote from an outer surface. The interior of shaft housing 236 supports two fixed pins 240, 242 attached to the housing 236 and a movable roller 244 connected to the push rod 226. As the airpot 222 receives or has removed therefrom the pneumatic pressure, motion of the rod 226 causes the roller 244 to move in accordance with the double ended arrow E.

A strap 224 is connected to upper pin 240 and passes over the moveable roller 224 and the lower pin 242. The strap therefor is capable of being tightened or loosened by translation of the roller 244 in the direction of the double ended arrow E. Note that the roller 244 is constrained to operate within a slot 246 formed in the housing 236, the slot 246 running parallel to the direction of travel of the airpot rod 226. The strap 224 is in turn coupled to the "C" clip 248 which accesses the scrolling rod 122 by means of an opening 112 (FIG. 3A) contained within the loop 108 formed on the side wall 118 of the shroud 90 so that appropriate tensioning can occur on the side walls 118 of the shroud 90. Note that a top wall 254 of the I-beam 228 includes a curved lip 256 on an outer edge thereof which coaxes against the loop 108 formed in the shroud side wall 118 to provide a tight seal once the "C" clip 248 is drawn down by pneumatic actuation.

Figure 7:
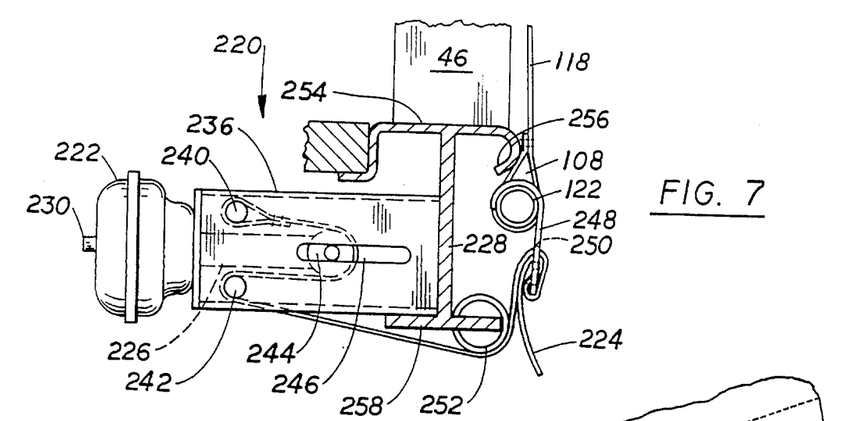
FIG. 7 is a side elevational view of a strap tightening means taken along line 7—7 of FIG. 1 to retain the side portion of the shroud.

FIG. 7 shows a version similar to the clamping means of

FIG. 6 but is located at extremities of the scrolling rod 122 whereas the FIG. 6 version is preferably oriented in a central area of the scrolling rod 122. As before, like reference numerals refer to like parts. In this version, a round pipe 252 is supported on a lower most horizontal flange portion 258 of the I-beam 228. The round pipe 252 provides the strap 224 with a convenient means for changing direction that is somewhat less stressful for the strap 224. As shown in FIG. 6, by contrast, the strap 224 passes through a slit 259 contained in the I-beam 228. Because the central portion of I-beam 228 has a greater height as shown in FIG. 6 as compared to FIG. 7 the rear and forward most portion of the I-beam shown in FIG. 7 provides a shelf 258 to support the housing 236. Preferably, there are five air pot tensioning assemblies 220 on each side of the wheeled body 12 (FIG. 1). The two outer most air pot assemblies 220 have their straps 224 riding on pipes 252 that are welded to the underside of the frame of the wheeled body 12 (see FIG. 7). The three air pot assemblies 220 that are between the two outer most air pot assemblies 220 have their straps 224 threaded through the frame of the wheeled body 12 (see FIG. 6). The "C" clips 248 are placed over the scrolling rods 122, the slack is taken up and tension is applied by individually driven air brake pots 222 that are actuated by a single source and coupled to the "C" clips 248 by way of a straps 224. Preferably, the straps 224 are secured to the "C" clips 248 by threading straps 224 in an "S" pattern through the holes 250 in "C" clips 248.

Figures 8, 9:
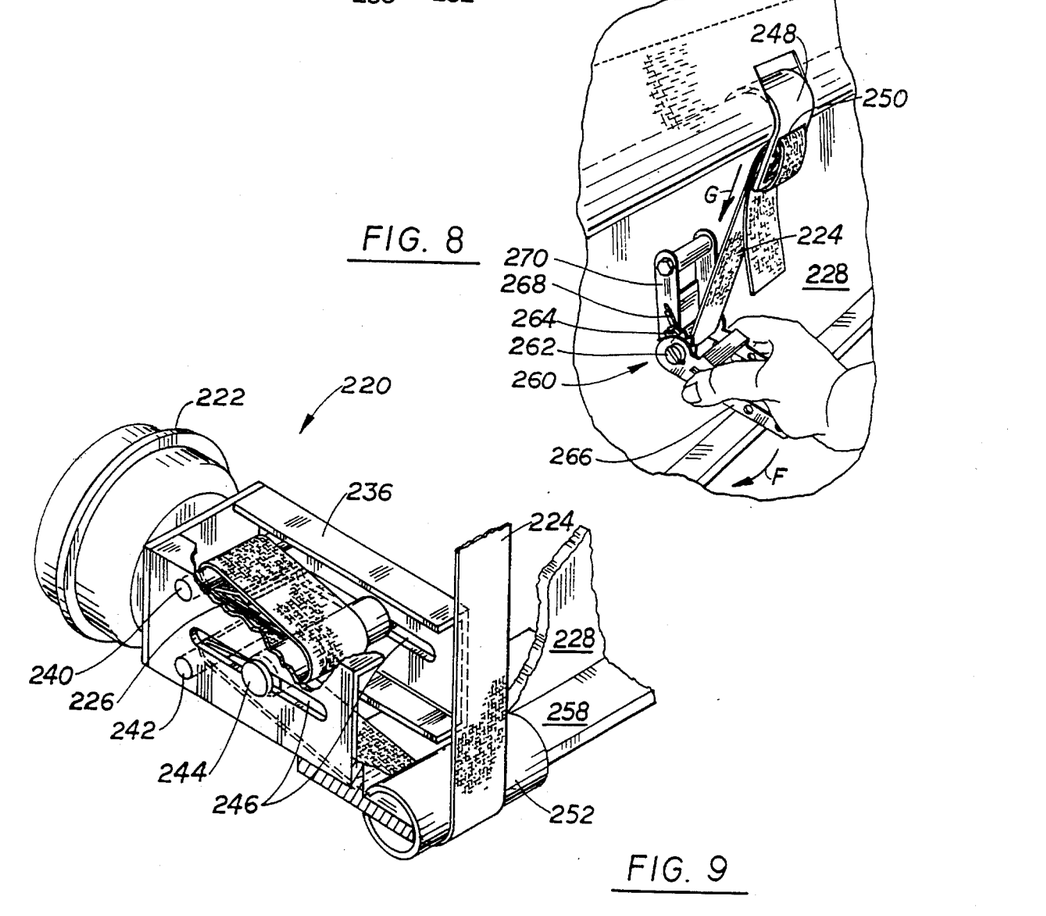
FIG. 8 is a perspective view of an alternative embodiment of the strap tighteners shown in FIGS. 6 and 7.
FIG. 9 is a partially fragmented perspective view of the airpot tightening means with the strap over a pipe that has been welded to the wheeled body.

FIG. 8 shows an alternative version of that which was shown in FIG. 6 and 7, and is characterized by the fact that each of the straps 224 is tensioned individually. In this version, each strap 224 is tensioned by means of a hand manipulated buckle 260 which provides tension on the strap 224 through a camming action. More particularly, the strap 224 is looped over a shaft 262. The shaft 262 cooperates with a gear mechanism 264 which is carried on a ratcheting handle 266 and cooperates with a pawl 268. The pawl 268 is mounted on the I-beam 228 by means of bracket assembly 270 so that when the ratcheting handle 266 is moved in the direction of arrow F, the strap is distended in the direction of the arrow G and tightened. Because the roller 262 pinches against the strap 224, the strap locking mechanism of the FIG. 8 embodiment is analogous to a "come-a-long" type device which provides incremental advancement of the strap 224 along the direction of arrow G to provide proper tensioning. The cam locking action causes the ratcheting handle 266 to be maintained in a tensioned position by motion in the direction of the arrow F. Release of the strap is afforded by moving the ratcheting handle 266 in an opposite direction.

In use and operation, and referring to FIG. 1, an operator loosens all of the straps 224 along the longitudinal sides of the wheeled body by way of a single valve on a pneumatic source. This disengages the airpots 222 thereby releasing the tension from the straps 224 that are attached to the airpots 222 at one end and to "C" clips 248 at the other. Once the tension has been removed from the straps 224 the "C" clips 248 can be freed from the scrolling rods 122 by hand and allowed to hang by way of the straps 224. Next, the hinged clamps 60 on the outside of the four corners of the framework are loosened by releasing each pawl 76 along arrow "H". Once released, the clamps 60 can be opened by hand or by bar 80 thereby allowing the unobstructed movement of the vertical sides 118 of the shroud 90. Standing at the rear or front end of the wheeled vehicle, depending on which longitudinal side 118 of the shroud 90 is to be opened, one uses the hand crank 160 to rotate the scrolling mechanism 120 which in turn is coupled, by way of a 90° gear knuckle joint 200, to the scrolling rod 122. This rotation of the hand crank 160 scrolls the sides 118 of the shroud 90 from a first lower position to a second elevated position thereby accessing the deck 18 of the wheeled body 12. Once the operation of loading or unloading the wheeled body 12 is completed the above procedure is reversed. One exception is that the ratchet mechanism 75 must be locked by moving pawl 76 into engagement with ratchet wheel 74 and tightened by rotating the wheel 74 with bar 80 by way of socket 82.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A side loading vehicle, comprising in combination:

a wheeled body having an upper surface upon which cargo is to be placed, a framework extending up from said upper surface, a shroud draped on said framework, scrolling means coupled to said shroud including drive means for raising and lowering said shroud to provide or occlude access to the upper surface of the wheeled body, said scrolling means includes a scrolling rod extending through said shroud at a lower longitudinal edge thereof, said drive means operatively coupled to said scrolling rod for rotation of said scrolling rod to raise and lower said shroud by rolling up said shroud, said drive means further includes a gear box operatively coupled to a crank and, a driving rod having a first driving arm and a second driving arm, said first driving arm telescopically disposed within said second driving arm, and said second driving arm communicating with said scrolling rod by means of a knuckle joint.

2. The vehicle of claim 1 wherein said shroud includes a top portion, and two longitudinally extending side portions integrally formed therewith, said longitudinally extending side portions each having said lower longitudinal edge, loops running along each said lower longitudinal edge thereof.

3. The vehicle of claim 2 wherein said scrolling means includes two said scrolling rods, one each respectively extending through each said loop on each said lower longitudinal edge of each said longitudinally extending side portion, and two said drive means, one each operatively coupled to each said scrolling rod for rotation of each said scrolling rod and each said longitudinally extending side portion, whereby each said drive means raises and lowers each said longitudinally extending side portion.

4. The vehicle of claim 3 wherein each said drive means includes one said driving rod operatively coupled to a hand crank for rotation of each said driving rod and therefor each said scrolling rod.

5. The vehicle of claim 2 wherein said framework includes means for attaching said top portion of said shroud thereto;

whereby forces exerted on said shroud during transit of said vehicle will be resisted by said top portion attachment means.

6. The vehicle of claim 1 including means on each leading and trailing vertical edge of each said longitudinally extending side portions of said shroud for sealing said shroud with respect to ambient forces associated with the vehicle during transit.

7. The vehicle of claim 1 wherein said framework includes a front and rear frame disposed at front and rear extremities of said vehicle, longitudinally extending members connecting upper portions of said front and rear frame members together, rubber spacers interposed between each end of said longitudinally extending members and said upper portions of said front and rear frame members, whereby axial and torsional flexing motions are dampened, cross members rigidifying said longitudinally extending frame members including means to attach to tabs integrally formed on an inner surface of said longitudinally extending members for fastening thereto.

8. A side loading vehicle, comprising in combination:

a wheeled body having an upper surface upon which cargo is to be placed, a framework extending up from said upper surface, a shroud draped on said framework; and scrolling means coupled to said shroud for raising and lowering said shroud by a rolling action such that said shroud is wound in a spiral fashion about said scrolling means to provide or occlude access to the upper surface of the wheeled body, wherein said shroud includes a top portion, two longitudinally extending side portions integrally formed therewith, bottom portions of said longitudinally extending side portions including loops running along a longitudinal lower edge thereof for operative coupling to said scrolling means, wherein said scrolling means includes two scrolling rods, one each respectively extending through each said loop on one said longitudinal lower edge of each said longitudinally extending side portion, drive means operatively coupled to each said scrolling rod for rotation of each said scrolling rod and each said longitudinally extending side portion, whereby said drive means raises and lowers each said longitudinally extending side portion, wherein said drive means includes a driving rod operatively coupled to a hand crank for rotation of said driving rod and therefor said scrolling rod, wherein said framework includes means for attaching a roof portion of said shroud thereto, whereby forces exerted on said shroud during transit of said vehicle will be resisted by said roof portion attachment means, including means on each leading and trailing vertical edge of each said longitudinal side of said shroud for sealing said shroud with respect to ambient forces associated with the vehicle during transit, wherein said framework includes a front and rear frame disposed at front and rear extremities of said vehicle, longitudinally extending members connecting upper portions of said front and rear frame members together, rubber spacers interposed between each end of said longitudinally extending members and said upper portions of said front and rear frame members, whereby axial and torsional flexing motions are dampened, cross members rigidifying said longitudinally extending frame members including means to attach to tabs integrally formed on an inner surface of said longitudinally extending members for fastening thereto, wherein said drive means further includes a gear box operatively coupled to said crank and said driving rod includes a first driving arm and a second driving arm, said first driving arm telescopically disposed within said second driving arm, and said second driving arm communicating with said scrolling rod by means of a knuckle joint.

9. A side loading vehicle, comprising in combination:

a wheeled body having an upper surface upon which cargo is to be placed, a framework extending up from said upper surface, a shroud draped on said framework; and scrolling means coupled to said shroud for raising and lowering said shroud to provide or occlude access to the upper surface of the wheeled body, wherein said shroud includes a top portion and two longitudinally extending side portions integrally formed therewith, bottom portions of said longitudinally extending side portions including loops running along a longitudinal lower edge thereof for operative coupling to said scrolling means, wherein said scrolling means includes a scrolling rod extending through each said loop on each said longitudinal lower edge of each said longitudinally extending side portion, drive means operatively coupled to each said scrolling rod for rotation of each said scrolling rod and each said longitudinally extending side portion, whereby said drive means raises and lowers each said longitudinally extending side portion, wherein said drive means includes a driving rod operatively coupled to a hand crank for rotation of said driving rod and therefor said scrolling rod, wherein said framework includes means for attaching a roof portion of said shroud thereto, whereby forces exerted on said shroud during transit of said vehicle will be resisted by said roof portion attachment means, means on each leading and trailing vertical edge of each said longitudinal side of said shroud for sealing said shroud with respect to ambient forces associated with the vehicle during transit, wherein said framework includes a front and rear frame disposed at front and rear extremities of said vehicle, longitudinally extending members connecting upper portions of said front and rear frame members together, cross members rigidifying said longitudinally extending frame members including means to attach to tabs integrally formed on an inner surface of said longitudinally extending members for fastening thereto, wherein said drive means further includes a gear box operatively coupled to said crank and said driving rod includes a first driving arm and a second driving arm, said first driving arm telescopically disposed within said second driving arm, and said second driving arm communicating with said scrolling rod by means of a knuckle joint.

10. The vehicle of claim 9 including a means for tethering said longitudinal lower edge of said shroud to said upper surface of said vehicle; said tethering means including clamping means passing through said loop of said shroud, and means for tensioning said clamping means downwardly to rigidly support said clamping means in tight engagement under said longitudinal lower edge.

11. The vehicle of claim 10 wherein said means for sealing said leading and trailing edges of said shroud comprising:

a leading clamping arm and a trailing clamping arm, both adapted to move from a first to a second position, and press respectively against leading and trailing vertical edges of longitudinally extending side portions of said shroud, and pawl and ratchet mechanisms operatively coupled to said sealing means by means of said clamping arms, each said clamping arm locking said sealing means in rigid relationship with respect to each said vertical edge of said shroud.

12. A method for enclosing a volume above a vehicle having a flat bed to protect the thusly enclosed volume from the elements; the steps including:

constructing a framework with a top framework and open sides on the bed defining an outline of the enclosed volume, draping a flexible one-piece shroud over said top and two open sides of the framework to enclose the volume, attaching a roof portion of the shroud to the top of the framework to secure the shroud thereto, fastening the shroud to the bed, and further including providing a scrolling means on each side wall of the flexible shroud at a lowermost portion thereof, manipulating the scrolling means from a first, lowered position to a second, elevated position to expose the volume within the shroud, wherein manipulating the scrolling means includes first and second telescoping rods, connecting the rods to a scrolling rod via a knuckle joint and to a gear box and a crank.

13. The method of claim 12, further including applying a first clamping means on leading and trailing edges of longitudinal sides of the shroud when the shroud is in a downwardly deployed condition, providing a pawl and ratchet mechanism operatively coupled to the clamping means for locking the clamping means in a closed position, thereby sealing the longitudinal sides of the shroud against the predations of the environment.

14. The method of claim 13, including:

applying a second clamping means on a bottom most portion of each of the longitudinally extending side portions of the shroud, and downwardly tensioning said clamping means to fix the shroud in a downwardly deployed position.

15. The method of claim 14, including:

providing medial support for the framework by means of a jack extending between the bed and longitudinal frame members of the framework, manipulating the jack to provide compression on the jack between the bed and the longitudinal frame members, and removing the jack completely from the bed and longitudinal frame members thereby allowing the bed to be unobstructed when loading cargo.

16. The method of claim 14, further including forming front and rear panels at front and rear portions of the vehicle with an imperforate surface to seal the front and rear panels with respect to the top and sides of the shroud, manipulating the front and rear panels from a first, closed position to a second, open position to expose the volume defined behind the shroud.

17. The vehicle of claim 1 wherein said shroud includes at least one longitudinally extending side portion having a leading vertical edge.

18. The vehicle of claim 17 including means for sealing said leading vertical edge.

19. The vehicle of claim 18 wherein said sealing means includes a leading clamping arm adapted to move from a first to a second position, and press against said leading vertical edge of said longitudinally extending side portion of said shroud.

20. The vehicle of claim 19 including a pawl and ratchet mechanism operatively coupled to said sealing means by means of said leading clamping arm, said pawl and ratchet mechanism locking said leading clamping arm in rigid relationship with respect to said leading vertical edge of said shroud.

21. The vehicle of claim 20 including a sealing strip attached to a compression side of said leading clamping arm.

22. The vehicle of claim 21 wherein said sealing strip is rubber.

23. The vehicle of claim 1 wherein said shroud includes at least one longitudinally extending side portion having a trailing vertical edge.

24. The vehicle of claim 23 including means for sealing said trailing vertical edge.

25. The vehicle of claim 24 wherein said sealing means includes a trailing clamping arm adapted to move from a first to a second position, and press against said trailing vertical edge of said longitudinally extending side portion of said shroud.

26. The vehicle of claim 25 including a pawl and ratchet mechanism operatively coupled to said sealing means by means of said trailing clamping arm, said pawl and ratchet mechanism locking said trailing clamping arm in rigid relationship with respect to said vertical trailing edge of said shroud.

27. The vehicle of claim 26 including a sealing strip attached to a compression side of said trailing clamping arm.

28. The vehicle of claim 27 wherein said sealing strip is rubber.

29. The vehicle of claim 1 including means for tethering said lower longitudinal edge of said shroud to said wheeled body, said lower longitudinal edge having openings spaced apart and running along said longitudinal edge.

30. The vehicle of claim 29 wherein said tethering means includes respective clamping means passing through each said opening of said shroud.

31. The vehicle of claim 30 including means for tensioning said clamping means to rigidly support said clamping means in tight engagement under said longitudinal lower edge.

32. The vehicle of claim 1 wherein said framework includes a plurality of sections isolated by spacers.

33. The vehicle of claim 32 wherein said spacers are rubber.

* * * * *